United States Patent [19]

Göschl

[11] Patent Number: 5,611,435
[45] Date of Patent: Mar. 18, 1997

[54] APPARATUS FOR SORTING CONSTITUENTS OF A MIXTURE

[75] Inventor: Reinhard Göschl, Seebenstein, Austria

[73] Assignee: Technisches Büro Ing. Reinhard Göschl, Seebenstein, Austria

[21] Appl. No.: 625,677

[22] Filed: Apr. 3, 1996

Related U.S. Application Data

[63] Continuation of Ser. No. 304,649, Sep. 12, 1994, abandoned.

[30] Foreign Application Priority Data

Mar. 12, 1993 [AT] Austria ..................................... 494/93

[51] Int. Cl.⁶ .................................................. B07B 13/00
[52] U.S. Cl. ........................... 209/481; 209/694; 198/630
[58] Field of Search .................................... 209/479, 480,
209/481, 691, 694; 198/630, 774.3

[56] References Cited

U.S. PATENT DOCUMENTS

| | | | |
|---|---|---|---|
| 2,453,457 | 11/1948 | Platt et al. ............................. | 198/630 |
| 4,267,037 | 5/1981 | Merz et al. ......................... | 209/694 X |
| 4,353,315 | 10/1982 | Hayashi .............................. | 198/630 X |
| 4,653,344 | 3/1987 | Nelson .............................. | 198/774.3 X |
| 5,086,912 | 2/1992 | Howden, Jr. ..................... | 198/774.3 X |

FOREIGN PATENT DOCUMENTS

| | | |
|---|---|---|
| WO87/04087 | 7/1987 | European Pat. Off. . |
| 396529 | 4/1990 | European Pat. Off. . |
| 2803684 | 1/1978 | Germany . |
| 3139279 | 10/1981 | Germany . |
| 3804190 | 8/1988 | Germany . |
| 839906 | 6/1981 | U.S.S.R. ............................. 198/630 |
| 975521 | 11/1982 | U.S.S.R. ............................. 198/630 |
| 2121322 | 12/1983 | United Kingdom . |

Primary Examiner—William E. Terrell
Assistant Examiner—Tuan Nguyen
Attorney, Agent, or Firm—Henry M. Feiereisen

[57] ABSTRACT

Apparatus for sorting constituents of a mixture according to density and/or grain size includes a vibratory table which extends at an inclination underneath a feed inlet for transport in a conveying direction and sorting of the mixture. The vibratory table is subdivided transversely to the conveying direction into single table sections, with each table section being driven by two crankshafts of a crank mechanism and with the movement of the table sections being adjusted to each other by the crankshafts at a phase shift. In order to bridge the gap between successive table sections, flexible transition members are provided by which neighboring table sections are connected with each other end-to-end.

6 Claims, 4 Drawing Sheets

APPARATUS FOR SORTING CONSTITUENTS OF A MIXTURE

This is a continuation of application Ser. No. 08/304,649, filed Sep. 12, 1994, now abandoned.

BACKGROUND OF THE INVENTION

The present invention refers to an apparatus for sorting constituents of a mixture according to density and/or grain size, and in particular to a sorting apparatus of a type including an inclined vibratory table which is driven by crankshafts and arranged underneath a feed inlet.

In a conventional apparatus of this type, the entire work area is driven by two crankshafts, with several work tables arranged side-by-side in conveying direction and operated at a phase shift relative to each other. A sorting apparatus of this type achieves only a limited separation effect because the arrangement of only a single work table, which extends over the entire conveying path and evenly shakes the material, results only in an even and uniform treatment of the particles being separated.

The European patent application EP-A1 396 529 describes a separating device which operates by vibration and uses several inclined vibrating separating areas which are arranged successively to each other. The separation is significantly influenced by the direction of the vibration which causes different movement patterns of individual small grained constituents.

German patent application DE 3 306 769 describes a separating device for agricultural products, which includes a rotating drum. The unsorted mixture of products and other material is transported by a conveyor and exits the conveyor in such a manner that the drum surface is impacted at a certain angle relative to the horizontal. The separation effect is essentially influenced by the area of impact upon the drum surface and by the various impact forces exerted by the constituents, with the principal separation effect being obtained through conversion of a force vector component from the separating device onto the constituents of the material. The shape and specific weight of the material are secondary for purposes of separation.

German publication DE 3 804 190 describes an apparatus for classifying a material flow, in particular to remove hard particles from compost fractions. The classifier includes four rotating drums which are arranged above each other in the form of a steep staircase, with the compost being fed to the uppermost drum. The separation effect is attained, like in the previously described German publication DE 3 306 769, through rotation of the drums, with hard particles being laterally deflected from the surface of the drums while softer materials adhere to the rotating drums and exit on the other side thereof. Thus, the separation effect is attained through different adherence of the particles to the surface of the drums.

SUMMARY OF THE INVENTION

It is an object of the present invention to provide an apparatus for sorting or separating constituents of a mixture, obviating the afore-stated drawbacks.

In particular, it is an object of the present invention to provide an improved apparatus for sorting or separating constituents of a mixture by which the separation degree is considerably improved in dependence of the specific weight and the particle shape.

These objects, and others which will become apparent hereinafter, are attained in accordance with the present invention by subdividing the vibratory table transversely to the conveying direction into a plurality of single table sections, with each individual table section being supported by two crankshafts, and with the movement of the table sections being suited to each other at a phase shift, and by connecting the table sections with each other via flexible transition members.

Through subdividing the vibratory table into single table sections which are individually driven or operated through crankshafts and by bridging the space between neighboring table sections with flexible transition members, different throw characteristics are generated in the regions between the table sections so as to accomplish an overall more favorable throw characteristics and improved separation effect compared to prior art solutions. The present invention is based on the teaching to impart to the mixture a ballistic trajectory or throw parabola during repeated bouncing or throwing up of material fractions from one table section to next following table section. At the transitions between the individual table sections, different ballistic trajectories are generated according to the specific weight and configuration of the particles so that overall a more favorable throw characteristic is accomplished.

Preferably, the surface of the table sections extend parallel relative to each other at least over partial areas of the vibratory table and relative to the overall inclination of the vibratory table in this manner, the desired separation effect is achieved also with mixtures containing particles or fractions of only slightly differing specific weight.

According to a further preferred feature of the present invention, the crankshafts of neighboring table sections are turned relative to each other at an angle of about 45° to thereby attain a desired staggered motion or phase shift of the table sections and thus to achieve a most favorable separation degree.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
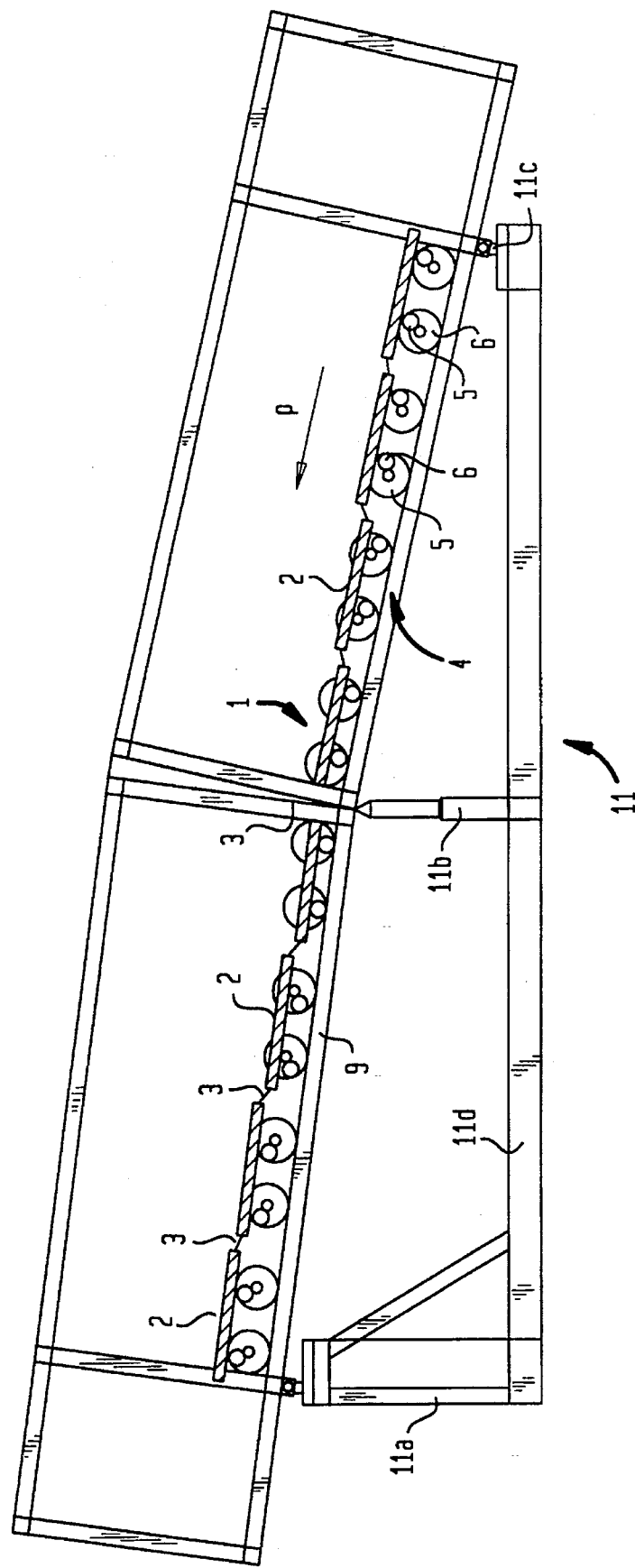
FIG. 1 is a schematic longitudinal section of one embodiment of an apparatus for sorting constituents of a mixture in accordance with the present invention.

Throughout all the Figures, the same or corresponding elements are always indicated by the same reference numerals.

Turning now to the drawing, and in particular to FIG. 1, there is shown a vibratory table, generally designated by reference numeral 1 for transporting and sorting a mixture or material in conveying direction as indicated by arrow P, with the vibratory table 1 being subdivided into single table sections 2. In the non-limiting example of FIG. 1, the vibratory table 1 includes a total of eight successively arranged tables sections 2 which are connected to each other end-to-end via flexible transition members 3 to bridge the gaps between successive table sections 2. The provision of the transition members 3 thus prevents material or constituents (particles) of the mixture from falling or passing through the gaps during their advance in conveying direction P and after exiting a table section 2.

Figure 4:
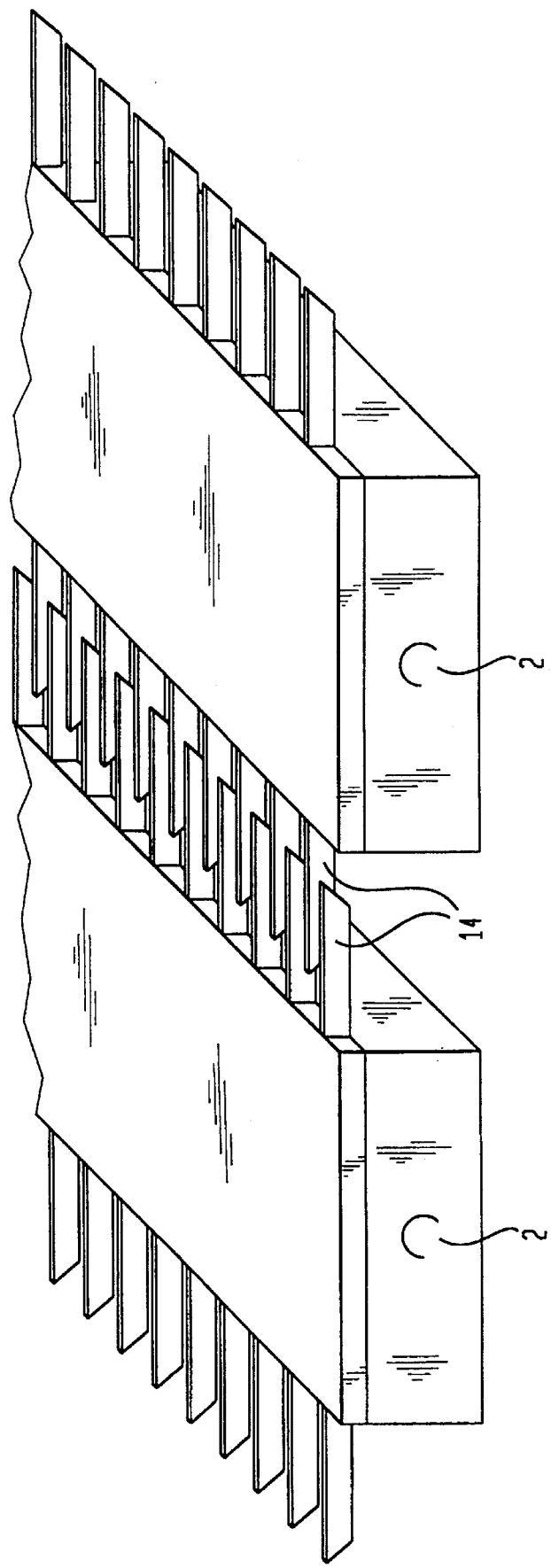
FIG. 4 shows a fragmentary and schematic perspective view of the apparatus according to the present invention, illustrating in detail a transition member of comb-like configuration.

Persons skilled in the art will understand that the transition member 3 may be of any suitable configuration. Examples for flexible transition members include a bellows or a comb-like seal in form of engaging sets of fingers 14 which project toward each other from neighboring ends of table sections 2 shown by way of example in FIG. 4.

Figure 2:
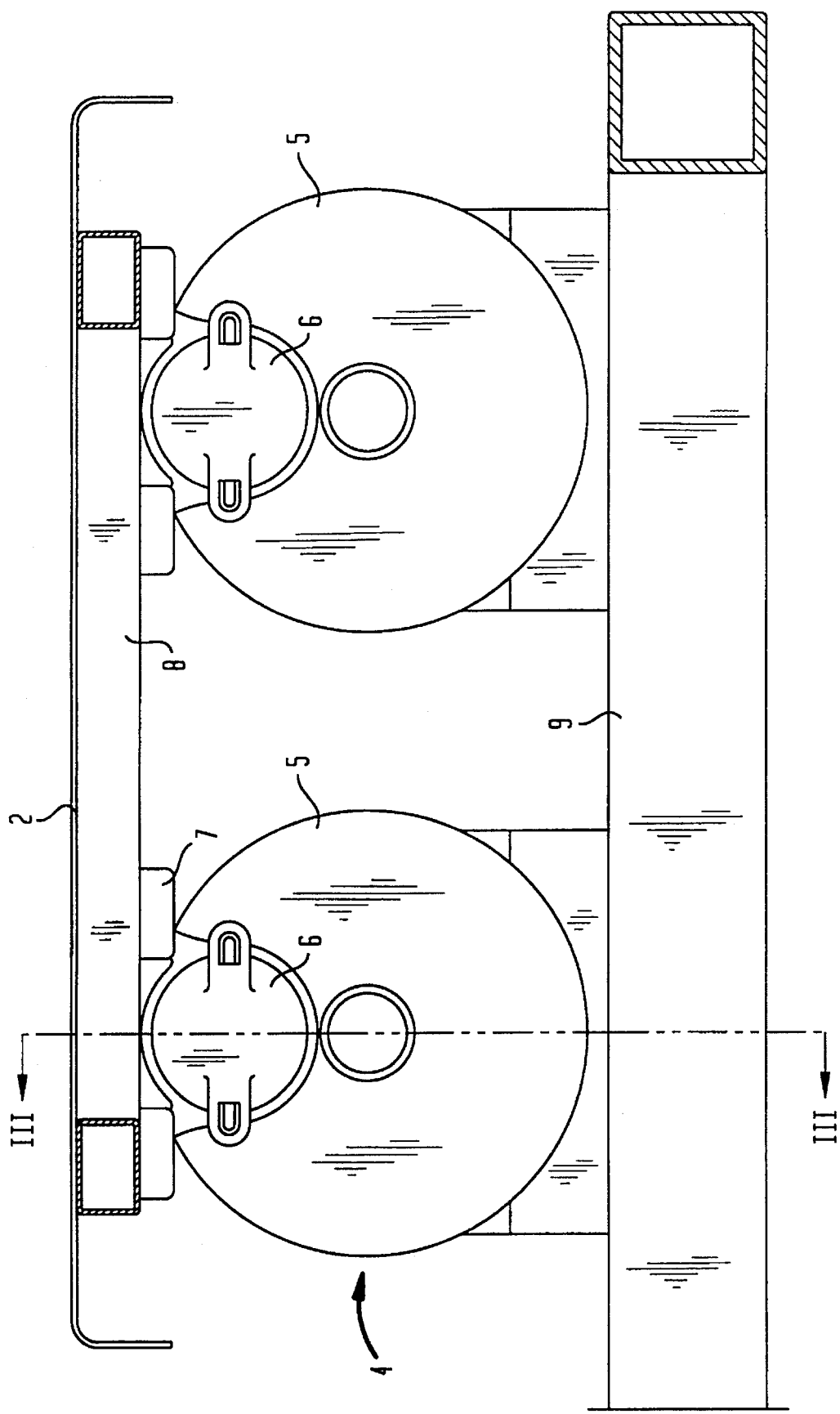
FIG. 2 is a sectional view of a table section taken along the line II—II in FIG. 3.
Figure 3:
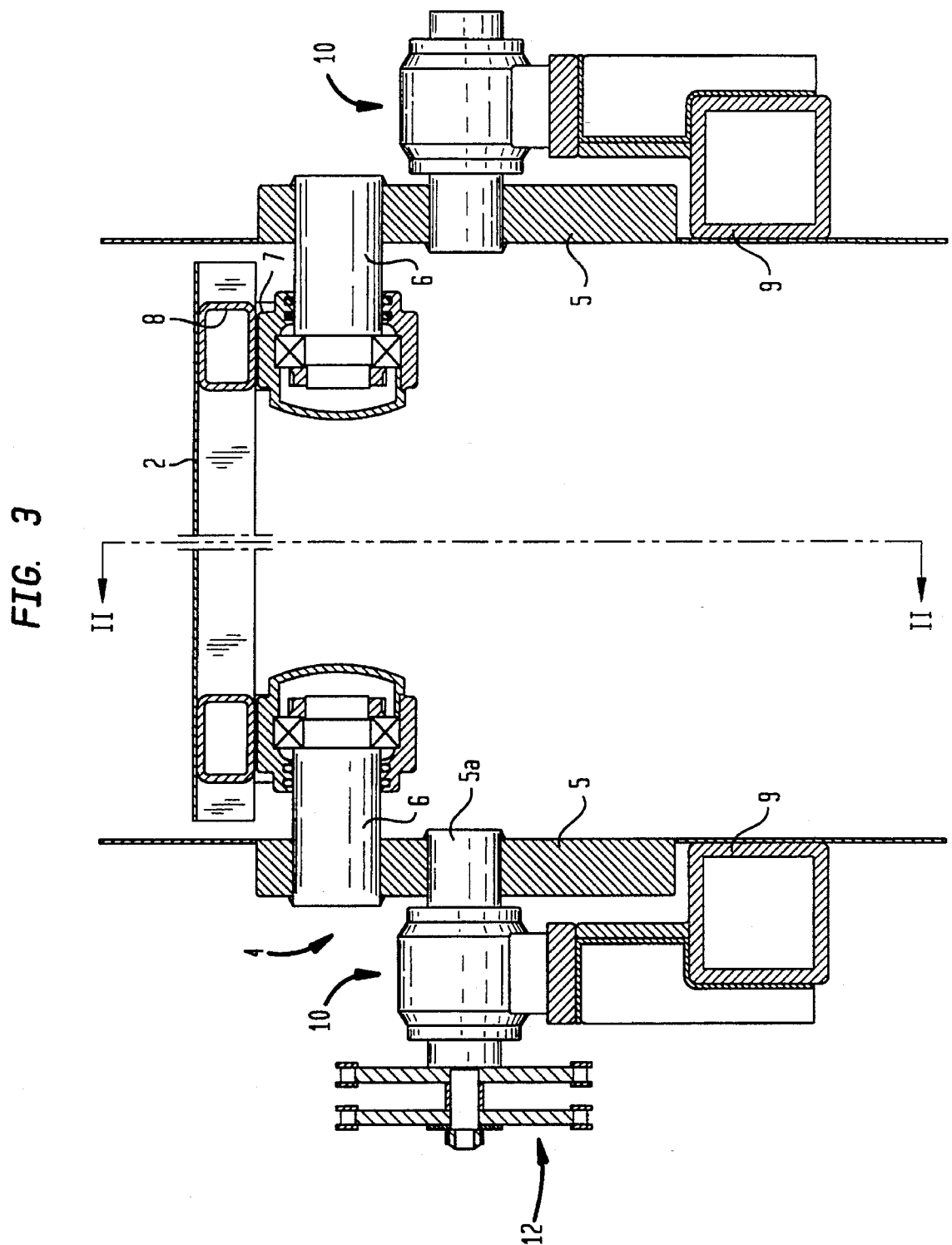
FIG. 3 is a sectional view of the table section of FIG. 2 taken along the line III—III in FIG. 2.

As shown in FIG. 1, each table section 2 is driven by a separate crank mechanism which is generally designated by reference numeral 4 and described in more detail in FIGS. 2 and 3. Each crank mechanism 4 includes two crankshafts 5a which respectively support on one end a crank disk 5. Each crank disk 5 extends laterally of the table section 2 and carries eccentrically a crank pin 6 which is secured to the respective table section 2. The crank pin 6 is supported in a bearing 7 which is mounted in a carrier frame 8 of the table section 2. The crankshafts 5a of each crank mechanisms 4 are supported by a frame 9 via bearings 10, with the frame 9 being mounted to a stand 11 for placement upon the ground. The crankshafts 5a and the crank disks 5 of the crank mechanisms are driven by lateral belt drives 12 which are suitably connected in succession to each other along the vibratory table 1 and run in synchronism.

Each table section 2 is further supported by two more disks 5 which follow the rotation of the crankshafts 5a. These disks 5 also carry each an eccentric crank pin 6 for securement to the carrier frame 8 of the table section 2 and are mounted to the frame 9 via bearings 10.

As shown in FIG. 1, the table sections 2 extend parallel relative to each other at least over partial areas of the vibratory table 1 and parallel relative to the overall inclination of the vibratory table 1. In addition, it is preferred to turn the crankshafts 5a and thus the disks 5 of neighboring table sections 2 relative to each other by an angle of about 45° so that the crank pins 6 and the table sections 2 are positioned at a phase shift and thus at different levels.

At operation, the table sections 2 of the vibratory table 1 swing or move up and down in a circular motion and at phase shift relative to each other so as to impart the vibratory table 1 with a wave-like motion over the entire transport path in conveying direction P. Thus, lighter particles are transported upwards while heavier particles fall off the lower end or roll down toward the lower end of the vibratory table 1.

The mixture being sorted or separated is fed to the vibratory table 1 at a suitable location (not shown) in the lower third of the transport path. Suitably, as shown in FIG. 1, the stand 11 includes three frame columns 11a, 11b, 11c which are secured with one end to a horizontal frame portion 11d and swingably mounted with their other ends to the frame 9. The columns 11a, 11b, 11c are of different height so as to position the frame 9 at a suitable inclination. The outer column 11a may be of fixed length or vertically adjustable. The central column 11b is preferably made of telescopic design to allow a vertical adjustment thereof.

As shown in the nonlimiting example of FIG. 1, the frame 9 is divided into two frame sections, with each frame section accommodating four table sections 2 of the vibratory table 1 and with the central column 11b being secured at the interface of the two frame sections. By suitably vertically adjusting the central column 11b, the inclination of the frame sections can be modified. As shown in FIG. 1, the lower section of the frame 9 has a greater slope than the upper section of the frame 9.

While the invention has been illustrated and described as embodied in an apparatus for sorting constituents of a mixture, it is not intended to be limited to the details shown since various modifications and structural changes may be made without departing in any way from the spirit of the present invention.

What is claimed as new and desired to be protected by Letters Patent is set forth in the appended claims:

I claim:

1. Apparatus for separating constituents of a mixture, comprising:

a feed inlet for supplying a mixture;

a vibratory table defined by a longitudinal axis and extending at an inclination underneath said feed inlet for separating the mixture into various fractions on the basis of density and/or grain size, said vibratory table being subdivided transversely to the longitudinal axis into single table sections arranged in succession in direction of the longitudinal axis at a distance from each other;

drive means for moving said table sections of said vibratory table in such a manner that successive table sections are driven at a phase shift from one another to separate lighter constituents of the mixture from heavier constituents of the mixture by bouncing the lighter constituents upwardly to discharge the lighter constituents from an upper end of the vibratory table and discharging the heavier constituents from a lower end of the vibratory table; and transition means secured to opposing ends of successive tables sections for preventing an escape of constituents during advance by said table sections.

2. Apparatus as defined in claim 1 wherein said table sections extend parallel to each other at least over a partial area of said vibratory table and parallel to the inclination of said vibratory table.

3. Apparatus as defined in claim 1 wherein each of said table sections of said vibratory table is individually supported by two crankshafts connected to said drive means.

4. Apparatus as defined in claim 3 wherein said crankshafts of neighboring table sections are turned at an angle of about 45° relative to each other.

5. Apparatus as defined in claim 1 wherein said transition means includes a flexible transition member.

6. Apparatus as defined in claim 1 wherein said transition means includes a comb-like seal.

* * * * *